US012663151B2

(12) United States Patent
Dumas

(10) Patent No.: US 12,663,151 B2
(45) Date of Patent: Jun. 23, 2026

(54) CUSTOMIZABLE CANDLE DEVICE

(71) Applicant: Garry Dumas, Somerville, MA (US)

(72) Inventor: Garry Dumas, Somerville, MA (US)

(*) Notice: Subject to any disclaimer, the term of this patent is extended or adjusted under 35 U.S.C. 154(b) by 370 days.

(21) Appl. No.: 18/388,234

(22) Filed: Nov. 9, 2023

(65) Prior Publication Data

US 2025/0155118 A1 May 15, 2025

(51) Int. Cl.
*F21V 35/00* (2006.01)

(52) U.S. Cl.
CPC .................................. *F21V 35/003* (2013.01)

(58) Field of Classification Search
CPC ............................... F21V 35/00; F21V 35/003
See application file for complete search history.

(56) References Cited

U.S. PATENT DOCUMENTS

| | | | | |
|---|---|---|---|---|
| 6,634,513 | B1 | 10/2003 | Hardy | |
| 7,637,738 | B2 | 12/2009 | Conover | |
| D645,999 | S | 9/2011 | Wens | |
| 10,519,399 | B2 | 12/2019 | Campbell | |
| D962,707 | S | 9/2022 | Lefkowitz | |
| D970,066 | S | 11/2022 | Roberson | |
| 2002/0102187 | A1 | 8/2002 | Bellenger | |
| 2006/0018786 | A1 | 1/2006 | Tolman | |
| 2012/0231401 | A1 * | 9/2012 | Hsu ......................... | F21V 35/00 431/289 |

FOREIGN PATENT DOCUMENTS

| | | |
|---|---|---|
| EP | 0994177 | 4/2000 |

* cited by examiner

*Primary Examiner* — Ko-Wei Lin

(57) ABSTRACT

A customizable candle device for interconnecting a plurality of scented candles to produce a custom aroma includes a plurality of containers that are positionable together to form a shape. Each of the plurality of containers comprises a bottom wall and a perimeter wall being attached to and extending upwardly from the bottom wall thereby defining an interior chamber. The perimeter wall has a top edge defining an opening into the interior chamber. The perimeter wall of each of the plurality of containers is couplable together whereby the plurality of containers is positionable together to form the shape. A candle is positioned within the interior chamber of each of the plurality of containers. A connector removably couples the plurality of containers together. A cover may be included which is positionable over the top edge of each of the plurality of containers and which selectively uncovers each of the plurality of containers.

19 Claims, 11 Drawing Sheets

CUSTOMIZABLE CANDLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to candle holders and more particularly pertains to a new candle holder for interconnecting a plurality of scented candles to produce a custom aroma.

(2) Description of Related Art Including Information Disclosed Under 37 CFR 1.97 and 1.98

The prior art relates to candle holders. Some candle holders have various modules to hold candles in a particular orientation or position relative to one another. Other prior art references disclose sectioned candles where the candle wax itself is partitioned or sectioned so that different scents are emitted by the candle while different parts of the wax are burning. For example, the prior art includes vertically segmented candles where each segment has its own fragrance. However, the prior art candles and holders are typically manufactured in pre-arranged positions or with pre-determined mixtures of scents. Thus, there is a need in the art for a customizable candle holder that can interconnect a plurality of scented candles to produce a custom aroma.

BRIEF SUMMARY OF THE INVENTION

An embodiment of the disclosure meets the needs presented above by generally comprising a plurality of containers that are positionable together to form a shape. Each of the plurality of containers comprises a bottom wall and a perimeter wall being attached to and extending upwardly from the bottom wall thereby defining an interior chamber. The perimeter wall has a top edge defining an opening into the interior chamber. The perimeter wall of each of the plurality of containers is couplable together whereby the plurality of containers is positionable together to form the shape. A candle is positioned within the interior chamber of each of the plurality of containers. A connector removably couples the plurality of containers together. A cover may be included which is positionable over the top edge of each of the plurality of containers. The cover selectively uncovers each of the plurality of containers thereby exposing the candle within the interior chamber of an uncovered one of the plurality of containers.

There has thus been outlined, rather broadly, the more important features of the disclosure in order that the detailed description thereof that follows may be better understood, and in order that the present contribution to the art may be better appreciated.

There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
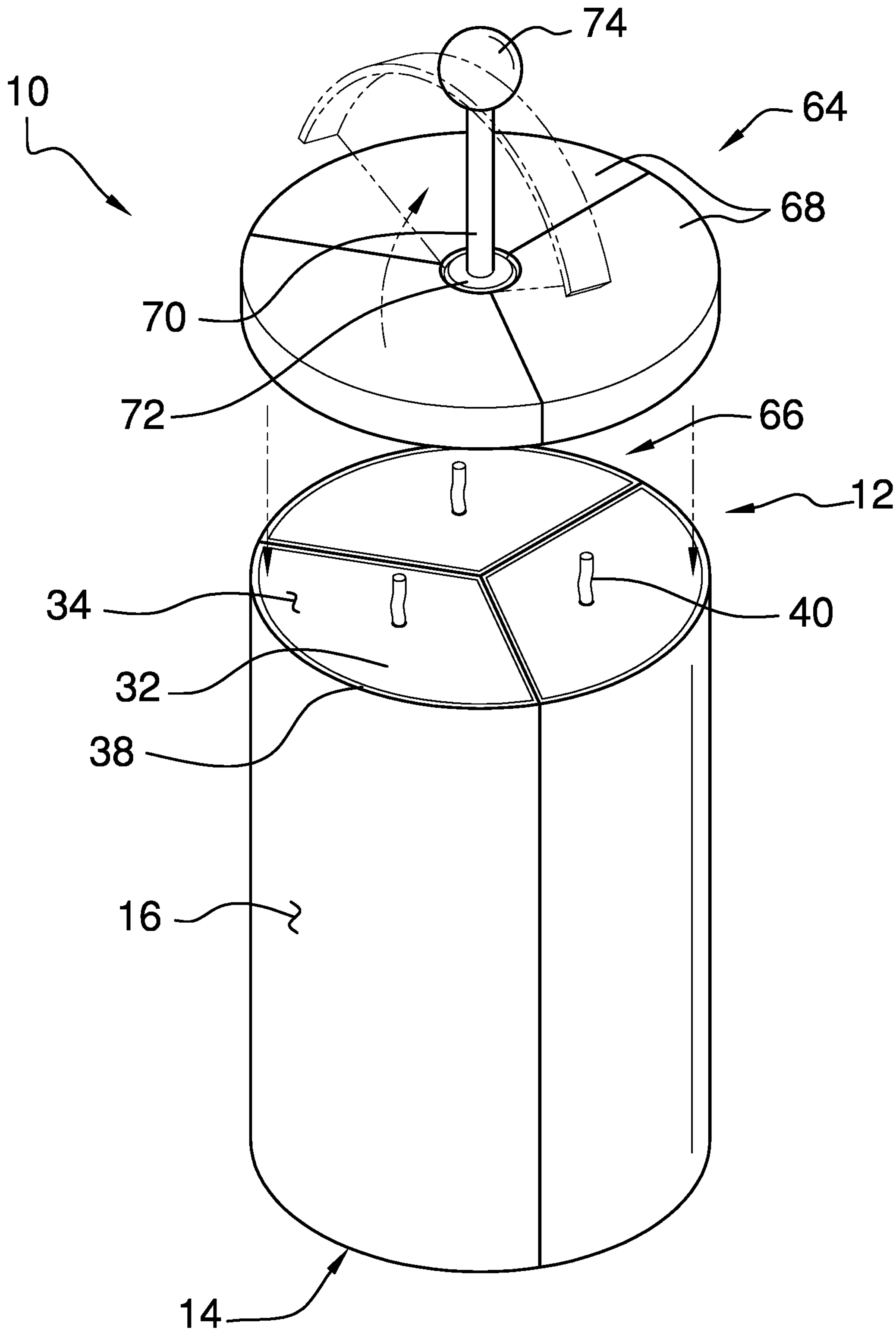
FIG. 1 is an isometric in-use view of a customizable candle device according to an embodiment of the disclosure.
Figure 2:
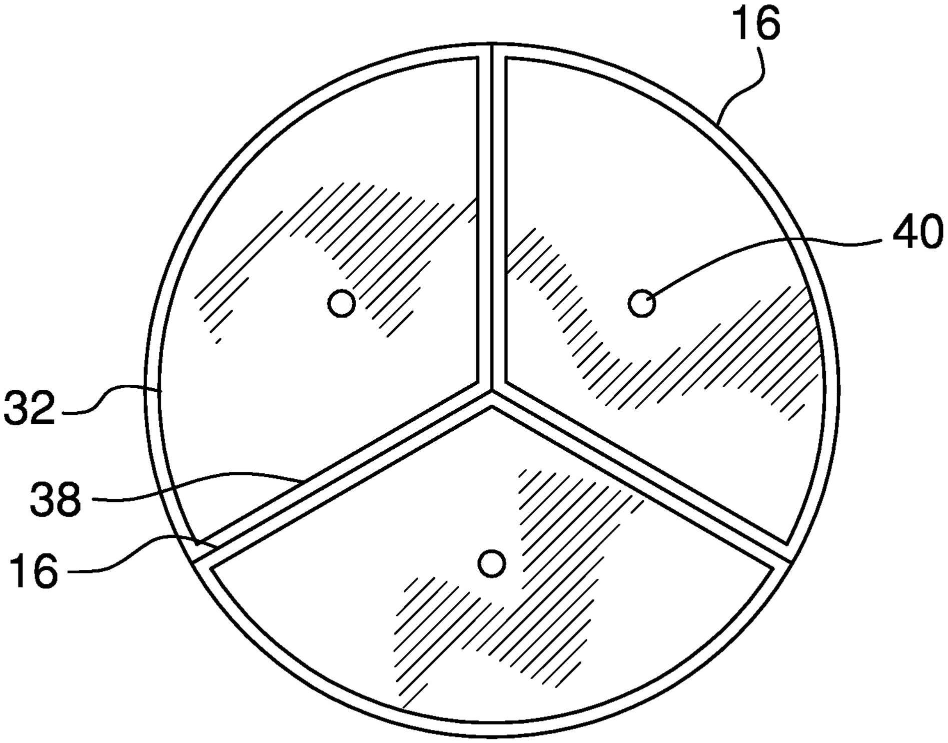
FIG. 2 is a top view of an embodiment of the disclosure.

With reference now to the drawings, and in particular to FIGS. 1 through 10 thereof, a new candle holder embodying the principles and concepts of an embodiment of the disclosure and generally designated by the reference numeral 10 will be described.

As best illustrated in FIGS. 1 through 10, the customizable candle device 10 generally comprises a plurality of containers 12 that are positionable together to form a shape. For example, the plurality of containers 12 may include three containers being positionable together to form a circular shape, as shown in FIG. 1. Alternatively, the plurality of containers 12 may be positionable together to form another shape, such as a square or a hexagon.

Each of the plurality of containers 12 generally comprises a bottom wall 14 and a perimeter wall 16 that is attached to and extends upwardly from the bottom wall 14 thereby defining an interior chamber 18. The perimeter wall 16 has a top edge 20 defining an opening 22 into the interior chamber 18.

Embodiments of the perimeter wall 16 may comprise a pair of angled faces 24 that are angled together to form a wedge shape. Each of the pair of angled faces 24 may have a rectangular shape and the pair of angled faces 24 may be angled together whereby the perimeter wall 16 forms a wedge shape. For example, each of the pair of angled faces 24 may be attached to a curved face 26 extending between the pair of angled faces 24 at an edge distal to the junction between the pair of angled faces 24. The curved face 26 is convexly arcuate between a first face 28 of the pair of angled faces 24 and a second face 30 of the pair of angled faces 24 whereby the pair of angled faces 24 forming the wedge shape can be positioned together to form a circular shape. In other embodiments, the pair of angled faces 24 forming the wedge shape may be positioned together to form alternative shapes, such as pentagons or parallelograms.

The perimeter walls 16 of each of the plurality of containers 12 are couplable together whereby the plurality of containers 12 is positionable together to form the shape. In embodiments, the plurality of containers may comprise any appropriate material, such as glass, plexiglass, metal, or plastic.

A candle 32 is positioned within the interior chamber 18 of each of the plurality of containers 12. The candle generally comprises an upper side 34, a lower side 36, and a peripheral side 37 that is attached to and extends between the upper side 34 and the lower side 36. The upper side 34 and the lower side 36 may be triangular thereby conforming with the wedge shape of the peripheral wall. The candle 32 may have a scent. Each candle 32 within each of the plurality of containers 12 may have a distinct scent.

Because the plurality of containers 12 can be coupled together, each candle 32 can be burned simultaneously to produce a custom aroma from each of the distinct scents. For example, a user may choose three scents, and connect the three candles 32 within three of the plurality of containers 12 to produce a custom scent for their home, office, or other space.

A wick 40 extends upwardly from the upper side 34 of the candle 32 within the interior chamber 18 of each of the plurality of containers 12. The opening 22 permits access to the wick 40. The candle 32 may be lit or burned using the wick 40. If the user only wants to produce a single scent, only the wick 40 of a single one of the candles 32 may be lit, and if the user wants to mix the scents to produce a customized aroma, the wicks 40 of multiple candles 32 may be lit.

A connector 42 removably couples the plurality of containers 12 together when the plurality of containers 12 are positioned together to form the shape. Each of the plurality of containers 12 can be easily removed and replaced, for example when the candle 32 runs out or when the user desires to produce a different aroma from the combined scents of each candle 32.

Figure 3:
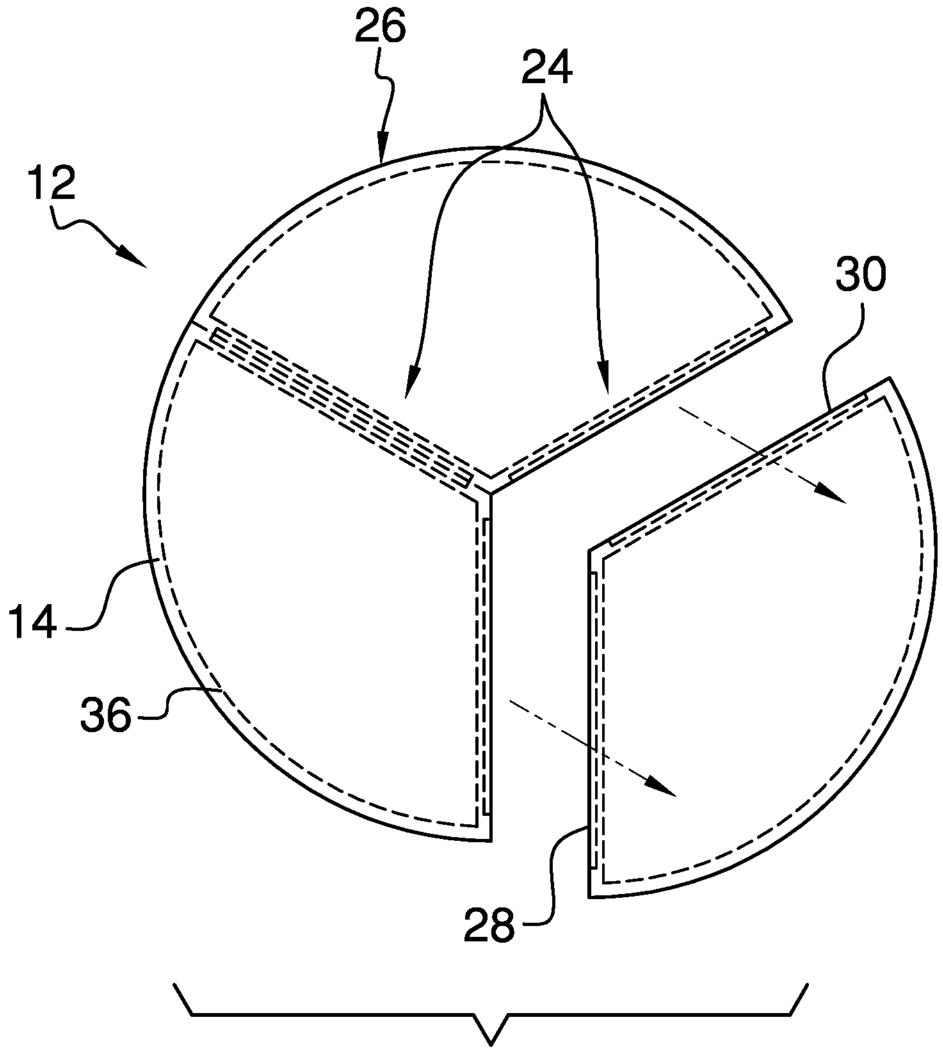
FIG. 3 is a bottom view of an embodiment of the disclosure.
Figure 4:
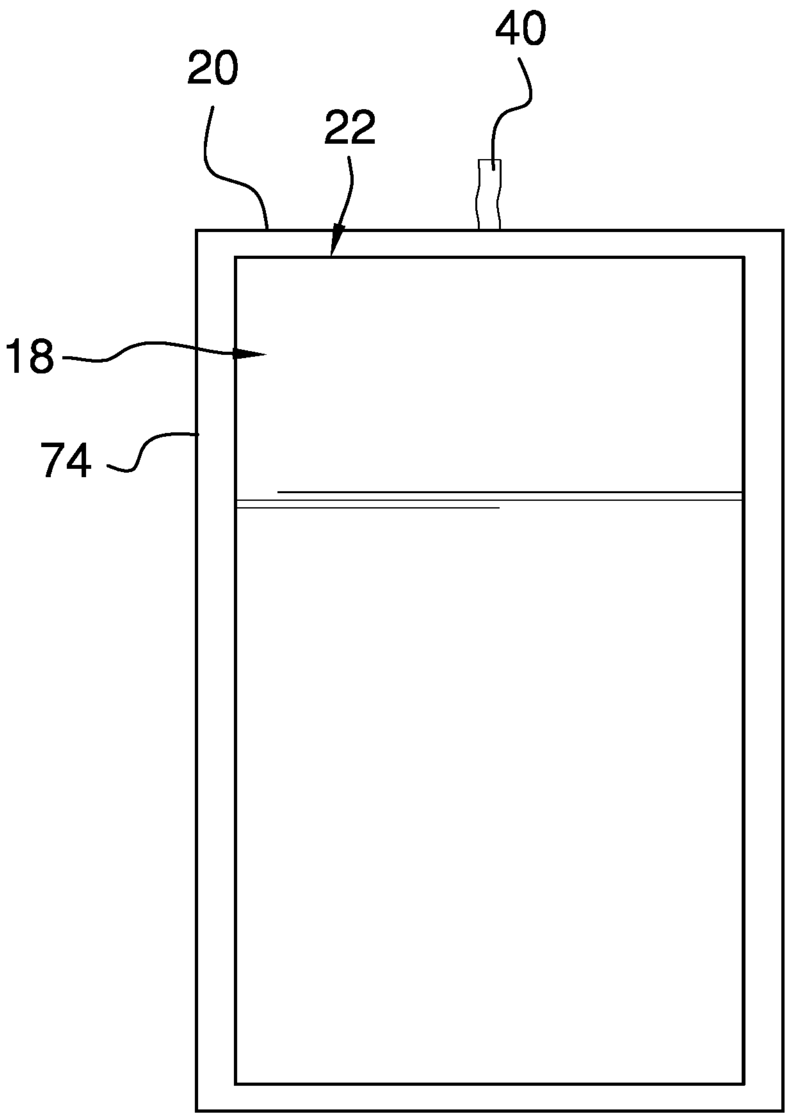
FIG. 4 is a side view of an embodiment of the disclosure.
Figure 5:
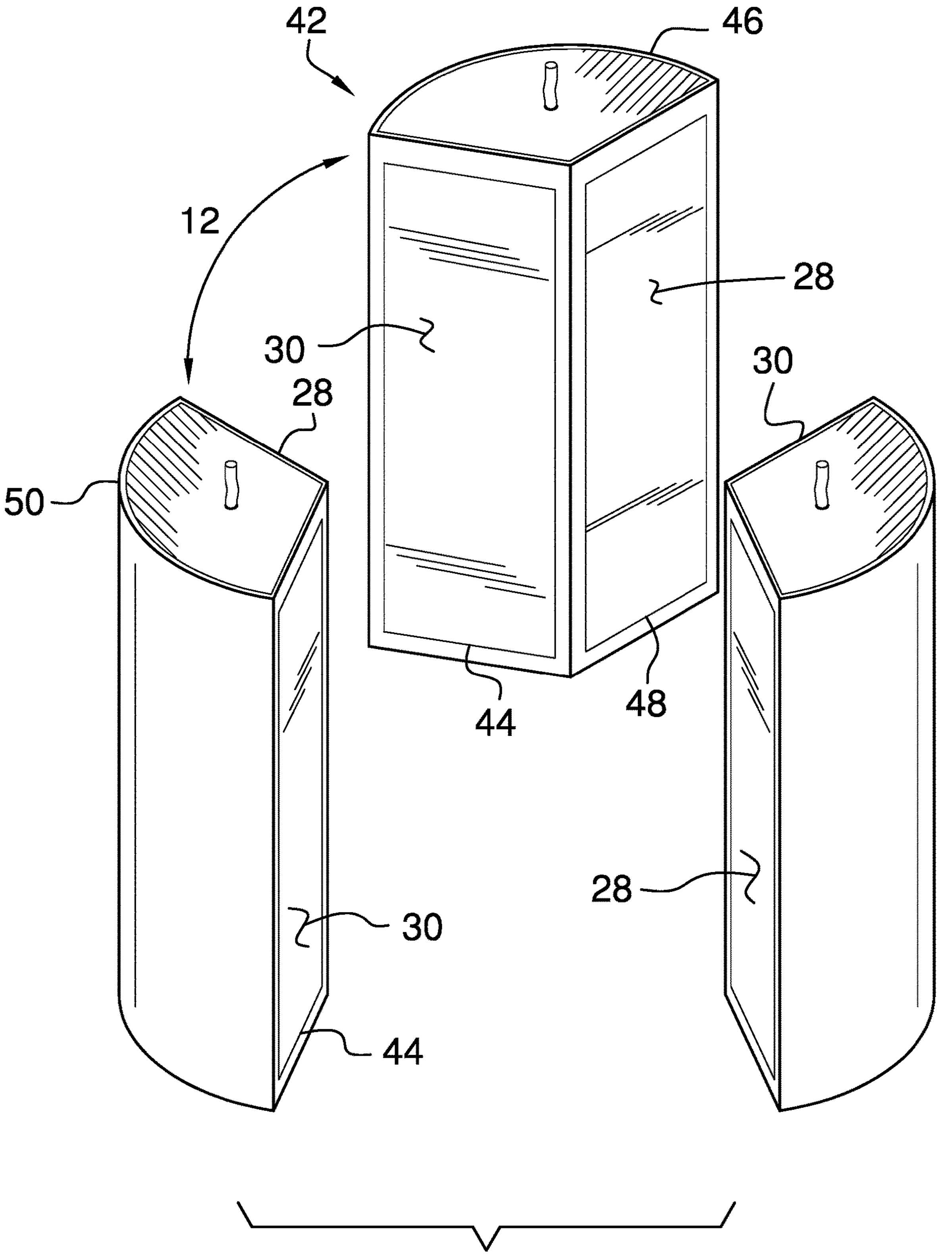
FIG. 5 is an exploded view of an embodiment of the disclosure.

In an embodiment shown in FIGS. 3 and 5, the connector 42 generally comprises magnets or magnetic materials that are attached to each of the pair of angled faces 24 of the perimeter wall 16. For example, a first magnetically active material 44 may be attached to the perimeter wall 16 of a first one of the plurality of containers 46. A second magnetically active material 48 may be attached to the perimeter wall 16 of a second one of the plurality of containers 50. The first magnetically active material 44 is aligned with the second magnetically active material 48 when the first one of the plurality of containers 46 is coupled to the second one of the plurality of containers 50. The first 44 and second 48 magnetically active materials are magnetically attracted to each other and removably coupling the first one of the plurality of containers 46 with the second one of the plurality of containers 50. In other words, the first magnetically active material 44 contacts and is magnetically retained in contact with the second magnetically active material 48 when the first one of the plurality of containers 46 is coupled to the second one of the plurality of containers 50.

In some such embodiments, the first magnetically active material 44 is attached to the first face of the pair of angled faces 28 and the second magnetically active material 48 is attached to the second face of the pair of angled faces 30. Thus, the first face 28 of the first one of the plurality of containers 46 is magnetically couplable to the second face 30 of the second one of the plurality of containers 50.

For example, the first magnetically active material 44 may comprise a first magnet and the second magnetically active material 48 may comprise a second magnet. The first magnet and the second magnet have complementary polarities such that the first 44 and second 48 magnetically active materials are magnetically attracted to each other. Alternatively, the first magnetically active material 44 may comprise a magnet and the second magnetically active material 48 may comprise a metallic material that is magnetically attracted to the magnet such that the metallic material is magnetically retained by the magnet.

Figure 11:
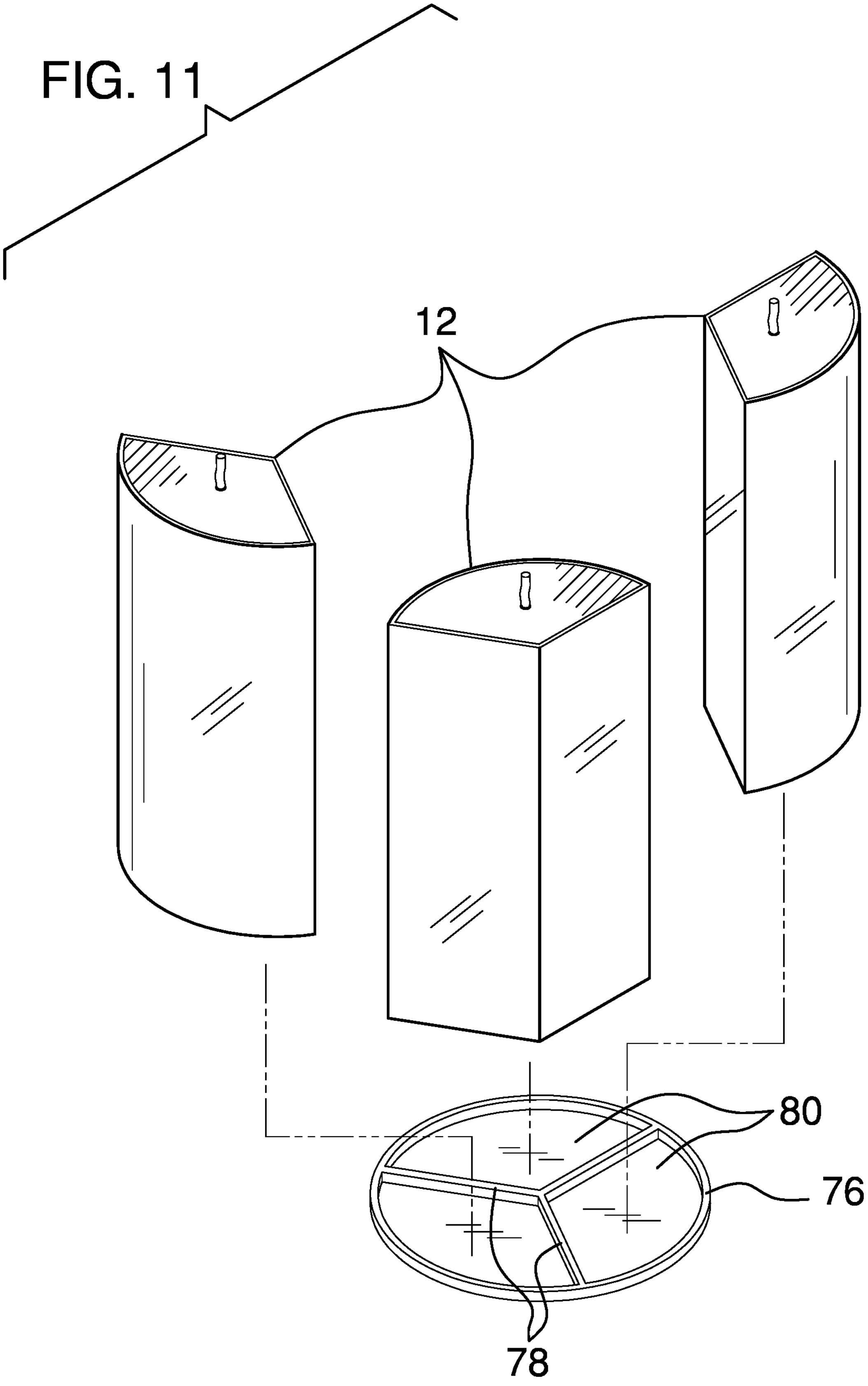
FIG. 11 is an exploded view of an embodiment of the disclosure.

In another embodiment, such as the embodiment shown in FIG. 11, the plurality of containers 12 may be positionable on a base plate 76. The base plate 76 may have a plurality of raised edges 78 forming respective sections 80. Each respective section 80 is generally configured to receive one of the plurality of containers 12. The plurality of containers 12 may be positioned within each of the respective sections 80 of the base plate 76 to form the shape. In such embodiments, the respective sections 80 on the base plate 76 would have a shape that is complementary to the shape of the plurality of containers 12. For example, when the plurality of containers 12 have a wedge or triangular shape, each of the sections 80 on the base plate 76 may also have a wedge or triangular shape, which is generally outlined by the raised edges 78, and the base plate 76 itself may be circular. In another example, the plurality of containers 12 may have a square or rectangular shape and each of the sections 80 may have a complementary square or rectangular shape. The base plate would accordingly have a square or rectangular shape configured to receive each of the plurality of containers when they are positioned together to form the shape.

In another embodiment, the bottom wall 14 of each of the plurality of containers 12 may include a magnet and the base plate 76 may include a magnet having complementary polarity. The two magnets can be magnetically attracted to one another such that the plurality of containers 12 are magnetically retained by the base plate 76. Alternatively, the raised edges 78 forming the respective sections 80 for receiving each of the plurality of containers 12 may independently retain the plurality of containers 12 in position relative to one another, for example by a friction fit.

In the embodiment shown in FIG. 11, each of the plurality of containers 12 are spaced apart from each other by the raised edges 78 of the base plate 76. In an alternative embodiment, each of the plurality of containers 12 may have an indented bottom edge section which fits into the respective sections 80 of the base plate 78. Each of the plurality of containers 12 may sit on the base plate 76 such that each of the plurality of containers 12 is flush with a neighboring one of the plurality of containers 12 above the base plate 76. The indented bottom edge section facilitates the plurality of containers 12 being positioned in the respective sections 80 such that each of the plurality of containers 12 are flush with each other over the base plate 76.

Figure 6:
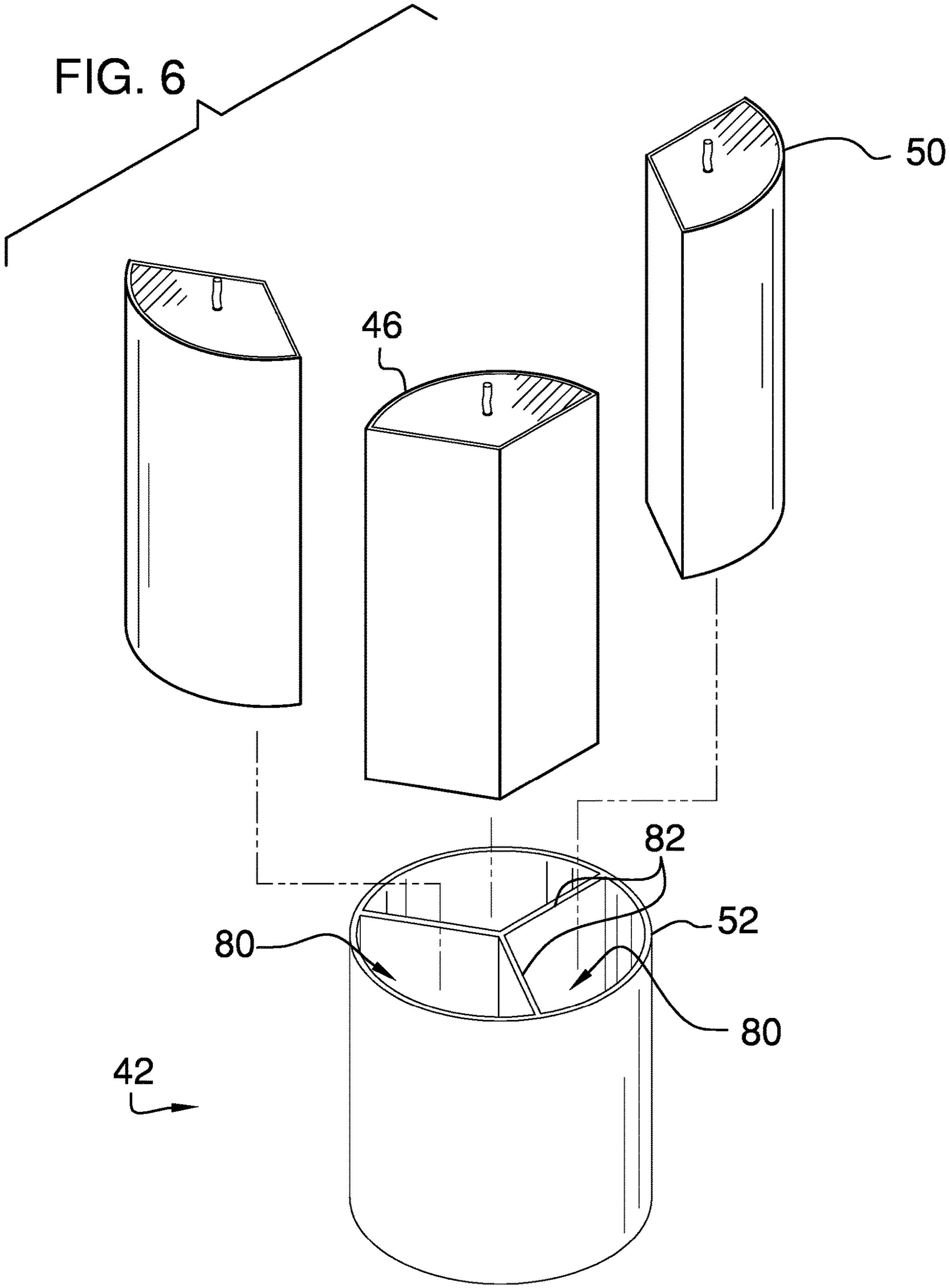
FIG. 6 is an exploded view of an embodiment of the disclosure.

In the embodiment shown in FIG. 6, the plurality of containers 12 are positionable within a sleeve 52. The sleeve 52 may have a circular shape that is configured to receive the plurality of containers 12. For example, three of the plurality of containers 12 may be positioned within the sleeve 52, as shown in FIG. 6, whereby the plurality of containers are positionable together within the sleeve 52 to form the circular shape. Alternatively, the sleeve 52 may have another shape, such as octagonal or trapezoidal, and the plurality of containers 12 may be positionable therein to form the octagonal or trapezoidal shape. In such embodiments, the plurality of containers 12 would have shapes complementary to the shape of the sleeve 52 such that two or more of the plurality of containers 12 may be positionable together within the sleeve 52.

Some embodiments may also include a divider 82 that is coupled to and positioned within the sleeve 52 to receive the plurality of containers 12. For example, the divider 82 may be positioned within the sleeve 52 to separate a plurality of inner areas 84 within the sleeve 52 such that each of the plurality of inner areas 84 is configured to receive one of the plurality of containers 12.

Figure 7:
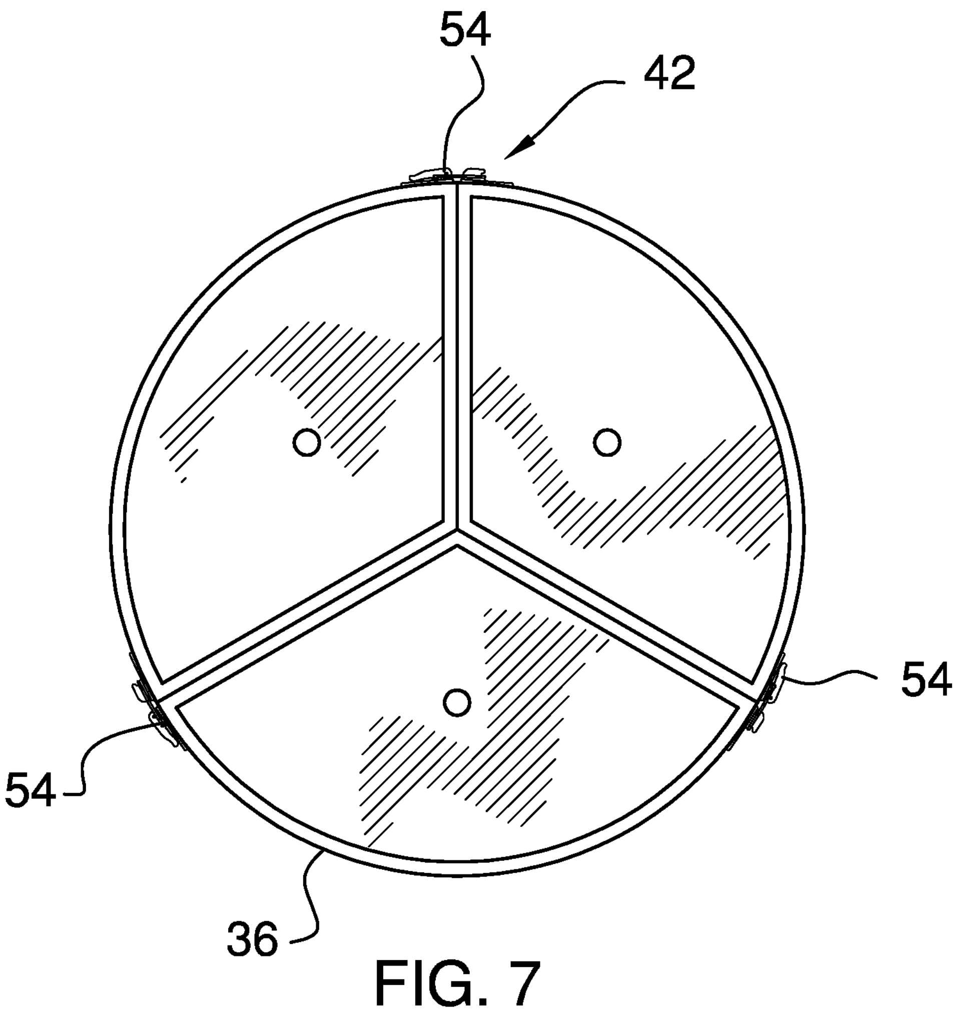
FIG. 7 is a top view of an embodiment of the disclosure.
Figure 8:
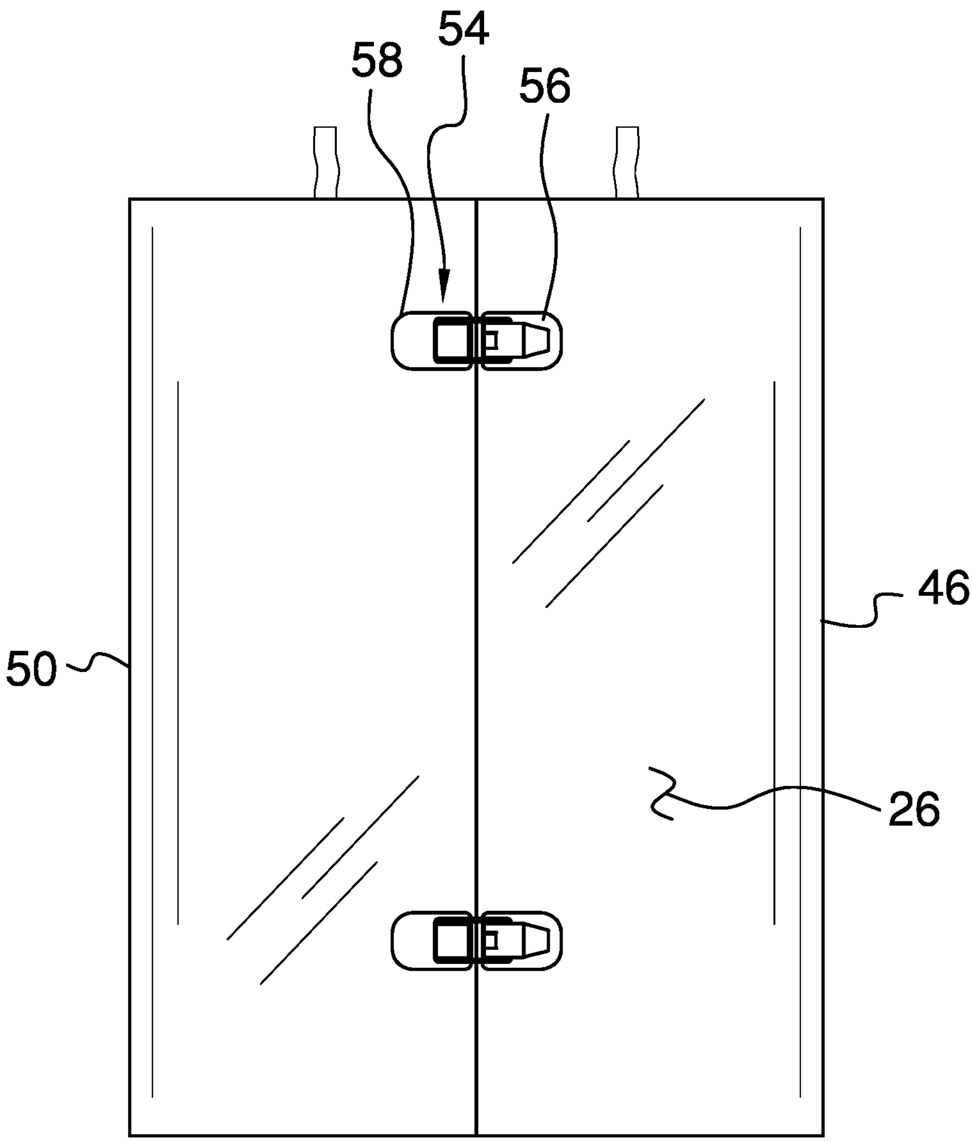
FIG. 8 is a front view of an embodiment of the disclosure.

FIGS. 7 and 8 depict and embodiment of the connector 42 using a latch 54 to releasably couple the plurality of containers 12 together. The latch 54 has a first portion 56 and a second portion 58. The first portion 56 is positioned on and attached to the perimeter wall 16 of the first one of the plurality of containers 46. The second portion 58 is positioned on and attached to the perimeter wall 16 of the second one of the plurality of containers 50. The first portion 56 aligns and is engageable with the second portion 58 when the first one of the plurality of containers 46 is positioned adjacent to the second one of the plurality of containers 60 thereby connecting the plurality of containers 12 together. For example, the latch 54 may be positioned on the curved face 26 of the perimeter wall 16.

For example, the first portion 56 may be attached to the first face of the pair of angled faces 28 and the second portion 58 may be attached to the second face of the pair of angled faces 30, whereby the first 56 and second 58 portions are alignable and engageable together to hold the plurality of containers 12 in the circular shape shown in FIGS. 7 and 8.

Figure 9:
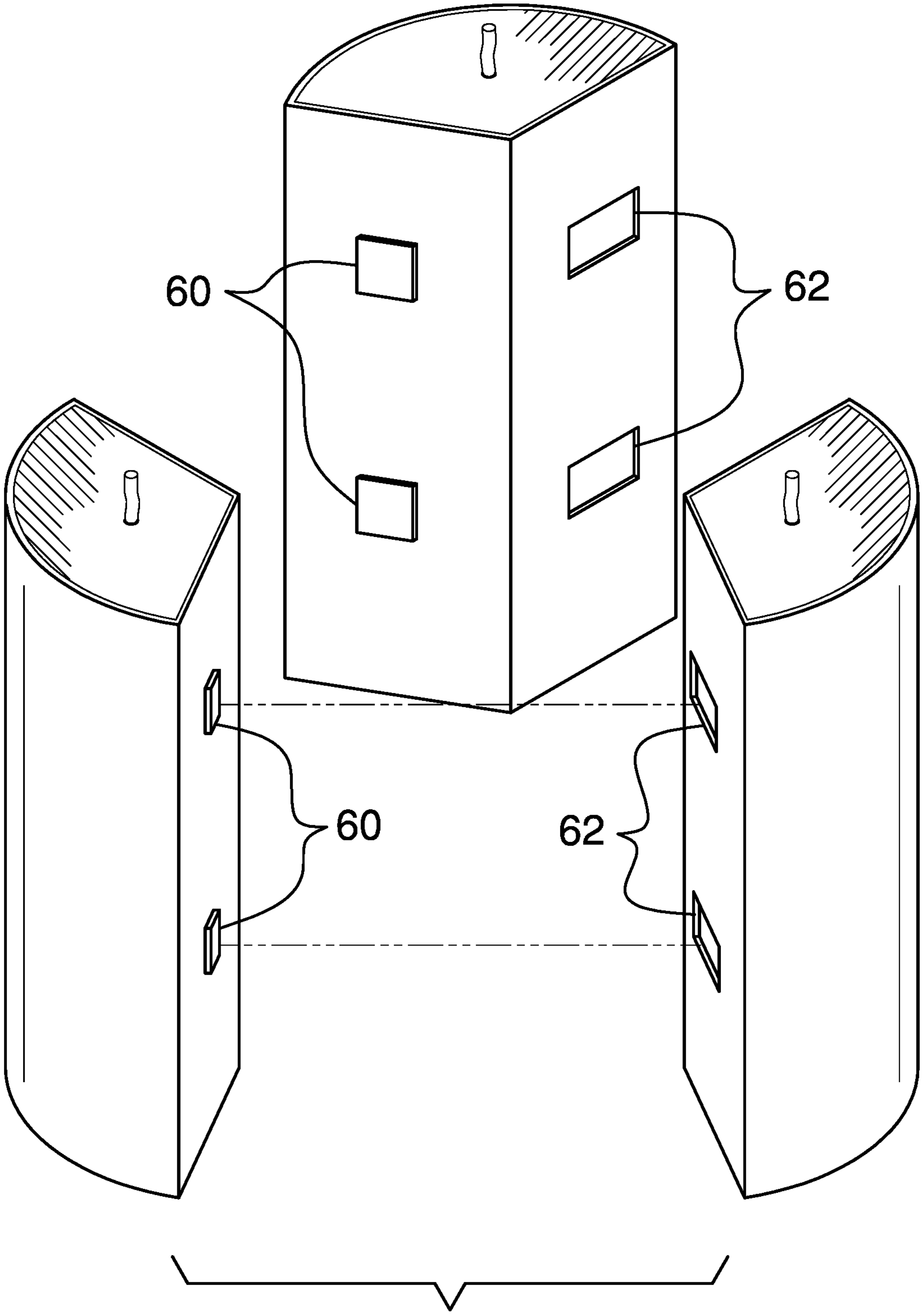
FIG. 9 is an exploded view of an embodiment of the disclosure.
Figure 10:
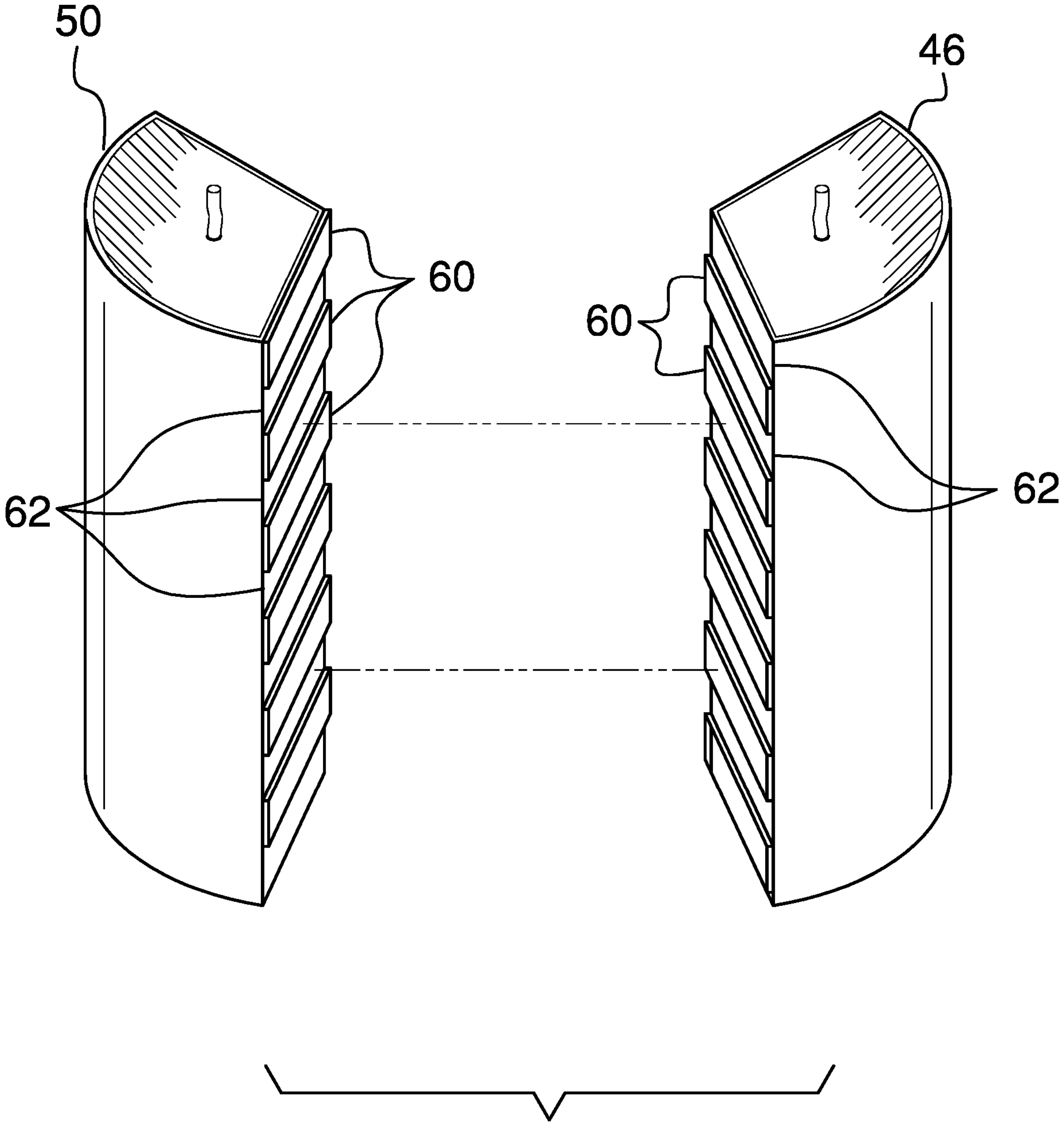
FIG. 10 is an exploded view of an embodiment of the disclosure.

FIGS. 9 and 10 depict an embodiment of the connector 42 using tongues 60 and grooves 62 formed in the perimeter wall 16. A tongue 60 may be attached to and extend outwardly from the first face of the pair of angled faces 28. The second face of the pair of angled faces 30 may have a groove 62 formed therein. The groove 62 has a shape that is complementary to a shape of the tongue 60 such that the groove 62 is configured to receive the tongue 60 thereby coupling the first face of the pair of angled faces 28 on the first one of the plurality of containers 46 with the second face of the pair of angled faces 30 on the second one of the plurality of containers 50.

The customizable candle device 10 may further comprise a cover 64 that is positionable over the top edge 20 of each of the plurality of containers 12. The cover 62 selectively uncovers the opening 22 of each of the plurality of containers 12 thereby exposing the candle 32 within the interior chamber 18 of an uncovered one of the plurality of containers 66.

In the example shown in FIG. 1, the cover generally comprises a plurality of lids 68 that are pivotably coupled together. Each of the plurality of lids 68 is positionable over a corresponding one of the plurality of containers 12. Each of the plurality of lids 68 pivots upwardly whereby the upper side 34 of the candle 32 within the corresponding one of the plurality of containers 12 is exposed thereby forming the uncovered one of the plurality of containers 66. For example, each of the plurality of lids 68 may pivot downwardly over the corresponding one of the plurality of containers 12 to seal the corresponding one of the plurality of containers 12. Each plurality of lids 68 may pivot upwardly to expose the candle 32 within the corresponding one of the plurality of containers 12. In some embodiments, the plurality of lids 68 includes a hinge which retains each of the plurality of lids 68 at in an open position above the plurality of containers 12 to expose the candle 32. In other embodiments, the plurality of lids 68 may engage a grooved rod extending upwardly from the plurality of lids 68 to retain each of the plurality of lids 68 in the open position above the plurality of containers 12.

Each of the plurality of lids 68 may alternatively comprise a magnetically active lid material, such as a metallic material. A rod 70 may extend upwardly from a midsection 72 between the plurality of lids 68. A magnetically active rod material 74, such as a magnet to which the metallic material of the plurality of lids 68 is magnetically attracted, may be coupled to the rod 72 opposite the midsection 72. The magnetically active rod material 74 is contactable by each of the plurality of lids 68 when each of the plurality of lids 68 is pivoted upward to selectively uncover the uncovered one of the plurality of containers 66 thereby exposing the candle 32.

The magnetically active lid material is attachable to the magnetically active rod material 74 thereby releasably coupling each of the plurality of lids 68 to the rod 70 when each of the plurality of lids 68 is pivoted upward. As indicated above, the magnetically active lid material may be a metal and the magnetically active rod material 74 may be a magnet that is attached to the rod 70 opposite the midsection 72. Each of the plurality of lids 68 contacts and being magnetically retained in contact with the magnet when each of the plurality of lids 68 is pivoted upward.

In use, the user can choose a group of the plurality of containers 12 to couple together into the shape. As shown in the drawings, that shape may be circular, although the plurality of containers 12 may also be positionable in alternative shapes. The particular scents of the candle 32 within each of the plurality of containers 12 can be mixed together to form a custom scent. If the candle 32 runs out, or the user wants a change in the aroma being produced by the mixture of scents, the user can simply remove one of the plurality of containers 12 from the group and replace it with an alternative. Additionally, the user can select a particular candle 32 within the plurality of containers 12 to put out using the plurality of lids 68. For example, the user can close one of the plurality of lids 68 above a respective one of the plurality of containers 12 to put out the candle 32 contained within that respective one of the plurality of containers 12. The user therefore does not need to put out all the candles within the customizable candle device 10 at once to adjust the aroma being produced by the mixture of scents.

The shapes named in this application are intended purely for illustrative purposes. Because the plurality of containers 12 may be positionable together to form any shape, the exemplary shapes in this description are intended to elucidate the invention and are not intended to restrict or confine the invention to the specific shapes of various embodiments that are described.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A customizable candle device comprising:
- a plurality of containers being positionable together to form a shape, each of the plurality of containers comprising:
  - a bottom wall;
  - a perimeter wall being attached to and extending upwardly from the bottom wall thereby defining an interior chamber, the perimeter wall having a top edge defining an opening into the interior chamber;
  - the perimeter wall of each of the plurality of containers being couplable together whereby the plurality of containers is positionable together to form the shape;
- a candle being positioned within the interior chamber of each of the plurality of containers; and
- a connector removably coupling the plurality of containers together.

2. The customizable candle device of claim 1, the candle further comprising an upper side, a lower side, and a peripheral side being attached to and extending between the upper side and the lower side.

3. The customizable candle device of claim 2, the upper side and the lower side being triangular.

4. The customizable candle device of claim 2, further comprising a wick extending upwardly from the upper side of the candle within the interior chamber of each of the plurality of containers.

5. The customizable candle device of claim 1, the candle having a scent.

6. The customizable candle device of claim 1, the connector further comprising:
- a first magnetically active material being attached to the perimeter wall of a first one of the plurality of containers;
- a second magnetically active material being attached to the perimeter wall of a second one of the plurality of containers;
- the second magnetically active material being aligned with the first magnetically active material when the first one of the plurality of containers is coupled to the second one of the plurality of containers; and
- the first and second magnetically active materials being magnetically attracted to each other and removably coupling the first one of the plurality of containers with the second one of the plurality of containers, the first magnetically active material contacting and being magnetically retained in contact with the second magnetically active material when the first one of the plurality of containers is coupled to the second one of the plurality of containers.

7. The customizable candle device of claim 6, the perimeter wall further comprising a pair of angled faces, wherein each of the pair of angled faces has a wedge shape, wherein the first magnetically active material is attached to a first face of the pair of angled faces and the second magnetically active material is attached to a second face of the pair of angled faces whereby the first face of the first one of the plurality of containers is magnetically couplable to the second face of the second one of the plurality of containers.

8. The customizable candle device of claim 6, the first magnetically active material comprising a first magnet, the second magnetically active material comprising a second magnet, the first magnet and the second magnet having complementary polarity such that the first and second magnets are magnetically attracted to each other.

9. The customizable candle device of claim 6, the first magnetically active material comprising a magnet, the second magnetically active material comprising a metallic material, the metallic material being magnetically attracted to the magnet such that the metallic material is magnetically retained by the magnet.

10. The customizable candle device of claim 1, the perimeter wall further comprising a pair of angled faces forming a wedge shape and the connector further comprising a sleeve being configured to receive at least two of the plurality of containers when the pair of angled faces of the perimeter walls of each of the plurality of containers are positioned adjacent to each other, whereby the plurality of containers are positionable together within the sleeve to form the shape.

11. The customizable candle device of claim 10, further comprising a divider being coupled to and positioned within the sleeve whereby the divider forms a plurality of inner areas within the sleeve, each of the plurality of inner areas being the wedge shape whereby each of the plurality of inner areas is configured to receive a corresponding one of the plurality of containers.

12. The customizable candle device of claim 1, the perimeter wall further comprising a pair of angled faces attached to a curved face extending therebetween, the curved face being convexly arcuate between a first face of the pair of angled faces and a second face of the pair of angled faces, wherein each of the pair of angled faces has a rectangular shape and wherein the pair of angled faces are angled together opposite the curved face whereby the perimeter wall forms a wedge shape.

13. The customizable candle device of claim 12, the connector further comprising:
- a latch having a first portion and a second portion, the first portion being positioned on the perimeter wall of a first one of the plurality of containers, the second portion being positioned on the perimeter wall of a second one of the plurality of containers; and
- the first portion aligning and being engageable with the second portion when the first one of the plurality of containers is positioned adjacent to a second one of the plurality of containers thereby holding the first one and the second one of the plurality of containers together.

14. The customizable candle device of claim 1, the connector further comprising:

a tongue being attached to and extending outwardly from a first face of a pair of angled faces; and a second face of the pair of angled faces having a groove formed therein, the groove being complementary to the tongue such that the groove is configured to receive the tongue thereby coupling the first face of the pair of angled faces of a first one of the plurality of containers with the second face of the pair of angled faces of a second one of the plurality of containers.

15. The customizable candle device of claim 1, further comprising a cover being positionable over the top edge of each of the plurality of containers, the cover selectively uncovering each of the plurality of containers thereby exposing the candle within the interior chamber of an uncovered one of the plurality of containers.

16. The customizable candle device of claim 15, the cover further comprising:

a plurality of lids being pivotably coupled together, each of the plurality of lids being positionable over a corresponding one of the plurality of containers, wherein each of the plurality of lids pivots upwardly thereby exposing the upper side of the candle within the corresponding one of the plurality of containers, each of the plurality of lids comprising a magnetically active lid material;

a rod extending upwardly from a midsection between the plurality of lids;

a magnetically active rod material being coupled to the rod opposite the midsection, the magnetically active rod material being contactable by each of the plurality of lids when each of the plurality of lids is pivoted upward to selectively uncover the uncovered one of the plurality of containers thereby exposing the candle; and the magnetically active lid material being attachable to the magnetically active rod material thereby releasably coupling each of the plurality of lids to the rod when each of the plurality of lids is pivoted upward.

17. The customizable candle device of claim 16, the magnetically active lid material further comprising a metal and the magnetically active rod material further comprising a magnet being attached to the rod opposite the midsection, each of the plurality of lids contacting and being magnetically retained in contact with the magnet when each of the plurality of lids is pivoted upward.

18. The customizable candle device of claim 1, further comprising a base plate having a plurality of raised edges extending upwardly from the base plate thereby forming respective sections, each of the respective sections being configured to receive a one of the plurality of containers, the plurality of containers being positionable within the respective sections to form the shape.

19. A customizable candle device comprising:

a plurality of containers being positionable together to form a shape, each of the plurality of containers comprising:

a bottom wall;

a perimeter wall being attached to and extending upwardly from the bottom wall thereby defining an interior chamber, the perimeter wall having a top edge defining an opening into the interior chamber;

the perimeter wall of each of the plurality of containers being couplable together whereby the plurality of containers is positionable together to form the shape;

a candle being positioned within the interior chamber of each of the plurality of containers, the candle comprising an upper side, a lower side, and a peripheral side being attached to and extending between the upper side and the lower side, the candle having a scent;

a wick extending upwardly from the upper side of the candle within the interior chamber of each of the plurality of containers, the opening permitting access to the wick;

a connector removably coupling the plurality of containers together when the plurality of containers are positioned together to form the shape, the connector comprising:

a sleeve being configured to receive at least two of the plurality of containers when the pair of angled faces of the perimeter walls of each of the plurality of containers are positioned adjacent to each other, whereby the plurality of containers are positionable together within the sleeve to form the shape;

a divider being coupled to and positioned within the sleeve whereby the divider forms a plurality of inner areas within the sleeve, each of the plurality of inner areas being a wedge shape whereby each of the plurality of inner areas is configured to receive a corresponding one of the plurality of containers;

a cover being positionable over the top edge of each of the plurality of containers, the cover selectively uncovering the opening each of the plurality of containers thereby exposing the candle within the interior chamber of an uncovered one of the plurality of containers, the cover comprising:

a plurality of lids being pivotably coupled together, each of the plurality of lids being positionable over a corresponding one of the plurality of containers, wherein each of the plurality of lids pivots upwardly thereby exposing the upper side of the candle within the corresponding one of the plurality of containers thereby forming the uncovered one of the plurality of containers, each of the plurality of lids comprising a magnetically active lid material;

a rod extending upwardly from a midsection between the plurality of lids;

a magnetically active rod material being coupled to the rod opposite the midsection, the magnetically active rod material being contactable by each of the plurality of lids when each of the plurality of lids is pivoted upward to selectively uncover the uncovered one of the plurality of containers thereby exposing the candle;

the magnetically active lid material being attachable to the magnetically active rod material thereby releasably coupling each of the plurality of lids to the rod when each of the plurality of lids is pivoted upward; and wherein the magnetically active lid material comprises a metal and wherein the magnetically active rod material comprises a magnet being attached to the rod opposite the midsection, each of the plurality of lids contacting and being magnetically retained in contact with the magnet when each of the plurality of lids is pivoted upward.

* * * * *